United States Patent [19]

Scarlata

[11] 4,205,656
[45] Jun. 3, 1980

[54] THERMAL STORAGE RESERVOIRS

[76] Inventor: Robert W. Scarlata, 913 Heritage Rd., Moorestown, N.J. 08057

[21] Appl. No.: 912,961

[22] Filed: Jun. 6, 1978

[51] Int. Cl.² .......................... F24H 7/00; F24D 11/00
[52] U.S. Cl. ..................................... 126/400; 126/263; 126/436; 126/437; 165/18; 165/133; 165/DIG. 4
[58] Field of Search ............... 126/400, 263, 204; 165/DIG. 4, 133, 4, 7, 10, 18

[56] References Cited

U.S. PATENT DOCUMENTS

| | | | |
|---|---|---|---|
| 608,755 | 8/1898 | Cottle | 126/400 |
| 965,391 | 7/1910 | Little | 126/400 |
| 2,388,940 | 11/1945 | Taylor | 126/400 |
| 2,856,506 | 10/1958 | Telkes | 126/400 |
| 3,029,806 | 4/1962 | Okuda | 126/400 |
| 3,154,141 | 10/1964 | Huet | 165/133 |
| 3,356,828 | 12/1967 | Furness | 126/400 |
| 3,369,541 | 2/1968 | Thomason | 126/400 |
| 3,464,486 | 9/1969 | Rice et al. | 126/400 |
| 3,513,828 | 5/1970 | Masters | 126/400 |
| 3,653,942 | 4/1972 | Boebel et al. | 165/133 |
| 3,773,031 | 11/1973 | Laing et al. | 126/400 |
| 3,968,786 | 7/1976 | Spielberg | 165/133 |
| 4,111,185 | 9/1978 | Swann | 126/400 |
| 4,114,600 | 9/1978 | Newton | 126/400 |
| 4,121,563 | 10/1978 | Gold | 126/400 |
| 4,127,161 | 11/1978 | Cylne et al. | 126/400 |

*Primary Examiner*—James C. Yeung
*Assistant Examiner*—Daniel J. O'Connor
*Attorney, Agent, or Firm*—Kyle W. Rost

[57] ABSTRACT

A thermal storage system for use with a solar collector and/or heat pump includes a plurality of discrete heat reservoirs having regular geometric shapes such as spheres or cylinders for forming a self-sorting array of the reservoirs when stacked in a storage bin. Each reservoir has a shell formed of heat conductive material defining an interior cavity that contains a material of high specific heat for storing heat in the reservoir. A preferred material for economy for reservoir shells in spherelike shapes is plastic with heat conductivity enhancers such as glass or metal particles incorporated into the plastic.

5 Claims, 6 Drawing Figures

U.S. Patent
Jun. 3, 1980
4,205,656
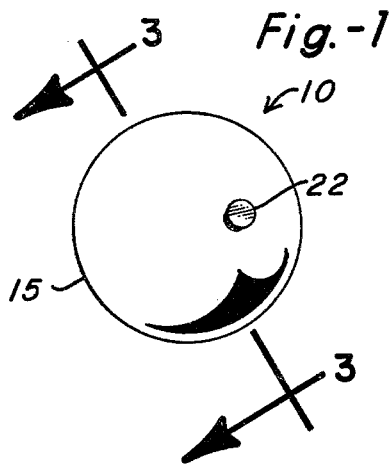
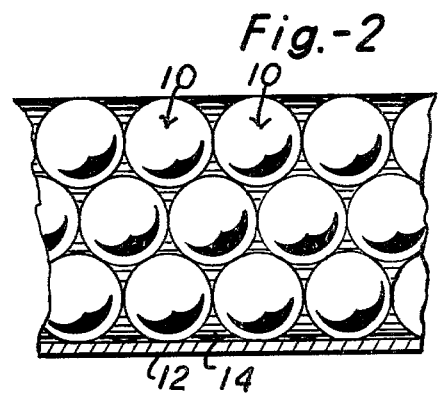
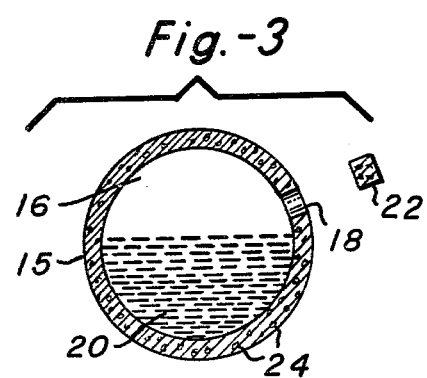
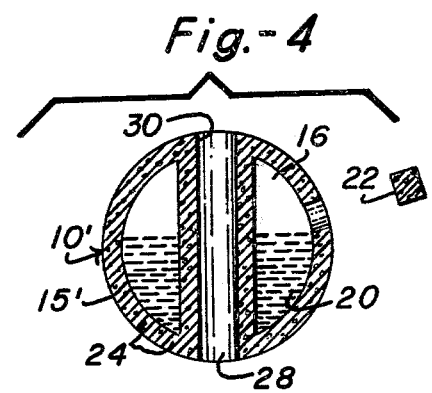
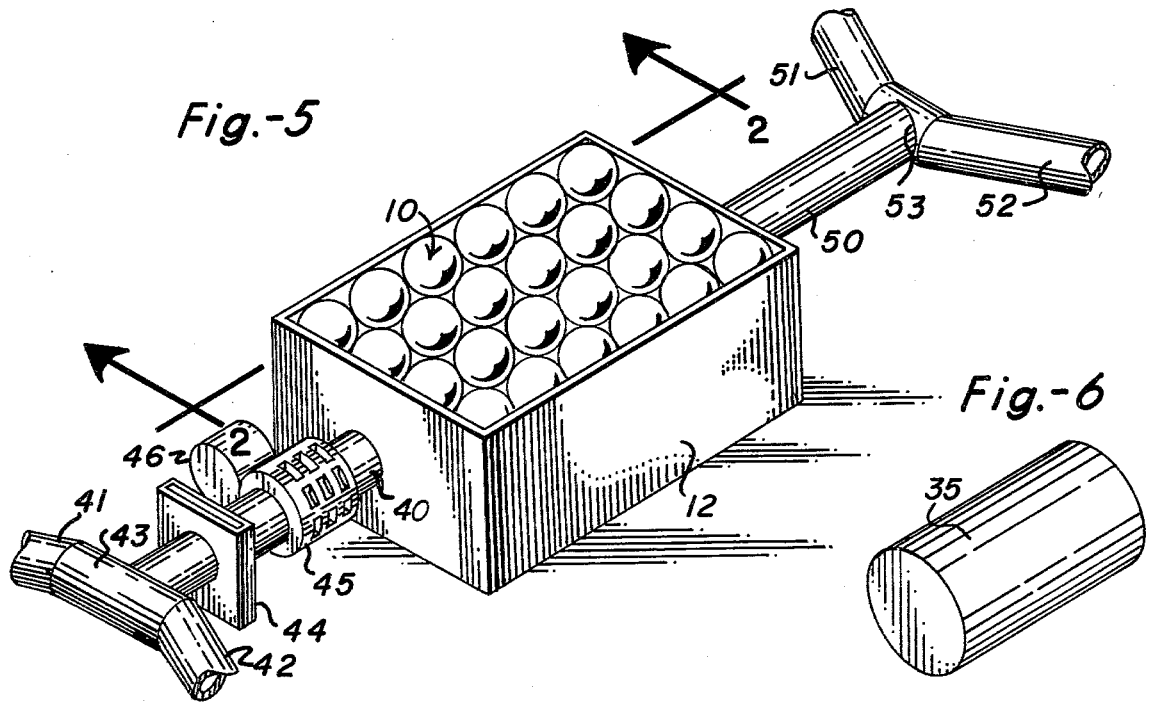

THERMAL STORAGE RESERVOIRS

BACKGROUND OF THE INVENTION

1. Field of the Invention

The invention relates generally to stoves and furnaces, and specifically to solar heat storage. A heat storage reservoir for use in solar heating apparatus or heat pumps is disclosed.

2. Description of the Prior Art

Solar heat collection is well known and may be accomplished by a wide variety of solar collectors that circulate hot air, hot water, and like fluids. Once the collector has heated the fluid, a long standing problem has been to adequately store the heat for later extraction and use. One of the oldest known storage techniques is to direct the heat energy or the heated fluid into a container of stones within an insulated room, as taught in U.S. Pat. No. 608,755 to Cottle. Similar teaching appears in U.S. Pat. No. 965,391 to Little, and U.S. Pat. No. 3,369,541 to Thomason. Stones, rocks, concrete blocks, bricks, and the like are well suited to receive heat over a prolonged period, such as the daylight hours of the day when sunlight can be converted to heat, and then radiate the heat for a further prolonged period, such as the night hours of the day.

In addition to stones, liquids are known as a heat storage media. In the above mentioned patent to Thomason, a central water tank is the primary heat exchanger for a heating system, and a surrounding bed of stones may exchange heat with the water tank. In other art such as U.S. Pat. No. 2,388,940 to Taylor and U.S. Pat. No. 3,029,806 to Okuda, special tanks and bag-like containers are used to store solar heated water. Liquids often have higher specific heat than rocks, and water conducts heat more rapidly than rocks, but solid heat storage media is often more feasible. Note: Water conducts heat much faster than stones. For example, water cannot effectively store heat at a temperature above boiling. Often a water storage system requires a heat exchanger in the liquid to bring air to a directly useable temperature for heating purposes. A rock bed provides heat storage and air-heating capability without an added heat exchanger.

Rock bed storage has a number of problems, one of the most serious being that air flow through a rock bed is not predictable because of the random shapes of the rocks. If air flow is too restricted through a rock bed, it is necessary to remove and reinstall the rock pile with air channels. Further drawbacks of rock storage include the labor and expense of moving rock piles and washing rock piles. Even after a rock bed storage system is properly in place, the rocks remain a source of dirt and dust and are capable of growing bacteria and fungus. While the life of a rock bed is quite long, certain types of rock bed have been reported to break up occasionally.

The invention maintains the many advantages inherent in rock bed heat storage media and overcomes all of the problems listed above. Further advantages will be evident from the description below.

SUMMARY OF THE INVENTION

A thermal storage system for use with a solar collector or heat pump employs a plurality of like-shaped containers for holding heat storage media. The containers are preferably spheres, although any number of similar shapes may be employed. The containers are stacked in a storage bin, preferably directly in contact with one-another, and a fluid heated by the solar collector is directed into the bin through an appropriate plenum. Each container may have an internal cavity that contains heat storage media such as water or phase change media. The shell of the container may be plastic with heat conductivity enhancers incorporated into the shell. The heated fluid from the solar collector readily transmits its energy through the shell and to the storage media because of the predictable fluid flow and good air turbulence through the stack of containers. At a subsequent time, the same characteristics of the thermal storage system benefit the extraction of energy from the storage media when the same or a different fluid at a lower temperature than the storage is passed through the bin for circulation to a using facility.

The object of the invention is to create an improved thermal storage system adapted for use with solar energy collectors and heat pumps. The invention recognizes that solar energy development requires both technological and economic analysis, and therefore offers a storage system that is superior in operational characteristics while maintaining a competitive cost position as compared to known rock storage systems.

Another object of the invention is to maximize total storage capacity, maximize combined surface area of the storage materials, minimize air flow restrictions, and maximize storage efficiency. This goal is preferably accomplished by placing water or a phase change material inside a plurality of sphere shaped storage containers and stacking the containers in direct contact within a storage bin connected to a solar collector.

A further object of the invention is to adapt inexpensive synthetic materials for use as containers and heat exchangers for heat storage media. Most plastic materials are poor heat exchangers and are ill suited to serve as heat reservoirs in an energy storage system. However, plastic containers with heat conductivity enhancers incorporated into their walls make the manufacture and use of uniformly contoured containers both technologically and economically practical. Also, less storage volume is required for equivalent heat flow, as compared to containers constructed of pure plastic.

BRIEF DESCRIPTION OF THE DRAWINGS

FIG. 1 is an isometric view of a sphere-shaped container for heat storage media.

FIG. 2 is a cross-sectional view taken along the plane 2—2 of FIG. 5.

FIG. 3 is a cross-sectional view of the sphere of FIG. 1 taken along the plane of line 3—3 of FIG. 1.

FIG. 4 is a view similar to FIG. 3, showing a modified embodiment of the invention.

FIG. 5 is an isometric view of a storage bin containing a plurality of the sphere-shaped containers with the top wall of the bin removed for clarity.

FIG. 6 is an isometric view of a cylindrical shaped container for heat storage media.

DESCRIPTION OF THE PREFERRED EMBODIMENT

The thermal storage system contemplates the use of a plurality of discrete heat reservoirs 10 used in combination. Each heat reservoir preferably has a regular geometric shape, with the shape and size of all of the reservoirs preferably being identical or reasonably similar. FIG. 1 illustrates the preferred form of a single heat reservoir to be a sphere, although it should be understood that other shapes may be used. A sphere is the ideal shape of the reservoir, producing the freest air flow pattern through a stack of the reservoirs while providing good fluid (air) turbulence necessary for rapid heat exchange between fluid and sphere, but other regular geometric shapes such as ellipsoids, pyramids, blocks, tetrahedrons, octahedrons, etc., could be employed in the invention. The term "sphere-like" will be hereafter employed to refer to regular geometric shapes that may vary from the form of a sphere in minor ways. For example, a regular dodecahedron and all regular shapes having a greater number of faces have sphere-like properties, as do ellipsoids, while a cube may be said to have no relevant sphere-like properties for the purposes of this disclosure, as a stack of cubes potentially has no air flow between the individual cubes.

As shown in FIGS. 2 and 5, a plurality of heat reservoirs is placed in a storage bin 12, and the reservoirs form a stacked pattern with predictable number and size of void areas or interstices 14, resulting in predictable air flow characteristics through the stack of reservoirs in the bin. Where the heat reservoirs are in the shape of spheres and are closely packed in the stack, approximately two-thirds (ideally 60%) of the volume of bin 12 will be occupied by the spheres and one-third (ideally 40%) will be occupied by the interstices.

The bin 12 may be a room or a special container suited to receive the heat reservoirs 10 packed in a random stack. The bin plus its contained reservoirs may be defined as the thermal storage system. Any number of types of solar heating apparatus may be employed in conjunction with the thermal storage system, some of which produce hot air while others produce hot water or related liquids. Depending on the nature of the solar heating apparatus and the temperature envelope in which it operates, the heat reservoirs should withstand temperatures from −100° F. to +300° F. for severe conditions, although a temperature range between 0° F. and 200° F. would be adequate for most applications with low and medium temperature solar hot air collectors used for heating and cooling, as well as for heat pumps.

Each heat reservoir is desired to retain heat well while having good surface conductivity. For this purpose, each reservoir 10 has an outer shell 15 defining an interior cavity 16, best shown in FIGS. 3 and 4. An aperture 18 in the wall of the shell 15 allows heat storage media 20 to be placed in the sphere, preferably filling cavity 16 or leaving a small air space, preferably 10% of cavity 16, for expansion purposes. Suitable sealing means such as plug 22 or a screw may close the aperture 18. Appropriate permanent sealants may be applied to the plug 22 to bond it in place. Preferably, the plug is plastic and is applied and sealed in one operation with a hot iron.

The shell 15 may be constructed from known materials having high surface heat conductivity, such as aluminum or copper. However, those materials present obstacles because of their high cost. The efficiency and low cost of solar heating systems are promoted if a thermal storage system can be created without the extensive use of high cost metals, as might make the cost of the thermal storage system prohibitive. Plastic materials and like synthetic materials offer a more cost effective alternative for shell construction and, in addition, are easily sealed to prevent vapor from escaping, are non-permeable and thus uneffected by water and many high specific heat substances, do not support bacteria growth, and are non-corrosive.

Although plastics offer a number of advantages as a compositional material for shell 15, plastics as a group do not conduct heat as well as metals, especially aluminum and copper. As one of the objects of the invention is to create a heat reservoir that has good heat conductivity at its surface plus good heat retention at its interior, plastics would appear to be a less than ideal compositional material. However, it is known that some plastics conduct heat better than others. The relative rates of heat conduction of three common plastics are reported below at Table I.

TABLE I

| THERMAL CONDUCTIVITY OF SELECTED PLASTICS (BTU-in/ft$^2$/hr/°F.) | | |
|---|---|---|
| All of these are unfilled | Phenolics | 3.3 |
| | Vinyls | .7 |
| | Polystyrene | .3–.8 |

From this table, it is evident that phenolics conduct heat eleven times better than polystyrene, suggesting that phenolics would be preferred as a shell material among the materials tested in Table I. Nevertheless, it has been found that thermal conductivity of the plastic shell can be improved by the addition of heat conductivity enhancers 24 to the shell. From 30% to 50% glass or metal particles by volume is preferred to enhance heat conductivity of the plastic. Further heat conductivity enhancement is achieved when the surface of shell 15 is roughly textured. The texturing is aided by a high percentage of powdered metal or glass fibers in the plastic.

The substance 20 placed within the cavity 16 of shell 15 is a heat storage media that receives heat conducted through the material of shell 15. Water or water and ethylene glycol mixtures are suitable. Phase change materials have also been used for retaining heat in thermal storage systems. The following table reports relevant qualities for some known phase change materials.

TABLE II

| Salt Hydrate | Melting point °F. | Heat of fusion btu/lb. |
|---|---|---|
| 1. Calcium chloride hexahydrate | 84–102 | 75 |
| 2. Sodium carbonate decahydrate | 90–97 | 106 |
| 3. Disodium phosphate dodecahydrate | 97 | 114 |
| 4. Calcium nitrate tetrahydrate | 103–109 | 60 |
| 5. Sodium sulfate decahydrate | 88–90 | 108 |
| 6. Sodium thiosulfate pentahydrate | 118–120 | 90 |

Some of these materials have been experimentally used in recycling tests and sodium sulfate decahydrate, known as Glauber's salt, is known in the art to perform well after repeated heating and cooling. Paraffins are also suitable as heat storage media but are too costly for wide scale use. A crystallization catalyst (nucleating agent) such as borax in small quantities is known to be a useful addition to Glauber's salt to prevent supercooling.

The reservoirs 10 may assume a number of shapes that preserve the essential advantages of the sphere shape. Referring to FIG. 4, the reservoir 10' has a modified shell 15' with a diametric passageway 28 traversing the interior cavity 16. Tubular wall 30 forms a boundry between the passageway 28 and the cavity 16. The added passageway increases the relative surface area of the heat reservoir with respect to the volume of cavity 16, and the passageway also increases the turbulence of the air or other fluid being passed through a stack of the reservoirs. The passageway provides another surprising advantage by aiding in removing heat when the phase change material in the sphere crystalizes. Crystallization begins around the edge of the sphere and the crystals act as insulators. The passageway allows additional heat to be easily removed from the liquid center of the phase change material.

The addition of passageways 28 is particularly important to the efficiency of heat conductivity and storage in the reservoirs. It is known that heat transfer from a solar heated fluid to the reservoirs is improved as the relative surface area of the reservoirs increases with respect to volume. As the reservoirs are made smaller, the surface area increases with respect to volume, but a practical limit on the smallness of the spheres is achieved when the volume of cavity 16 holds too little phase change material for adequate long term heat retention. The ideal size of a spherical reservoir has been found to be smaller than four inches in diameter with a size between one and three inches being preferred. The optimum size is approximately 2¼ inches. Sizes greater than four inches result in loss of heat conductivity efficiency and require an increase in the size of storage bin 12, while sizes smaller than one-half inch result in a loss of heat storage capacity and also require an increase in the size of bin 12. The addition of passageways through the reservoirs allows the conductivity of each reservoir to be increased disproportionately to the resultant loss of cavity volume, allowing fewer larger reservoirs to be used with performance characteristics equivalent to the use of a greater number of smaller reservoirs. The preferred passageway diameter is ¼ inch.

The spherical shape is a preferred regular geometric shape because, among other reasons, the reservoirs can be randomly stacked into a self-sorting array of extremely predictable pattern and, consequently, air flow characteristics. Nevertheless, certain practical considerations favor other shapes. In particular, it is difficult to produce great numbers of high quality sealed spheres with a liquid contained therein. Therefore, for many applications the preferred shape of the reservoirs may be that of a cylinder 35, FIG. 6, which preserves many of the advantages of the spherical shape because the cross-section of a cylinder taken normal to its axis is identical to the cross-section of a sphere taken through its center. Accordingly, a stack of identical cylinders with parallel axes will also have good air flow characteristics, although greater care will be required to place the cylinders in the bin with axis aligned and parallel. The techniques for manufacturing cylinders of the required type are already well known in the can making arts. Furthermore, cylinders can be inexpensively produced from highly desireable materials such as aluminum and the task of filling and permanently sealing these cylinders is perfected. Also, various protective coatings and techniques for their application have been developed to protect the aluminum from chemical interaction with heat storage media within the cylinder.

FIG. 5 shows a sample installation of the reservoirs 10 in a bin 12 connected to a hot air solar heating system. Plenum 40 provides an air intake with branch 41 leading from the solar collector and branch 42 leading from a dwelling house heating system. Valve 43 may be selectively operated to open either or both branches to the plenum 40. A single filter 44 is adequate in this system because of the predictable air flow characteristics of the stack of reservoirs and the greater cleanliness of the reservoirs as compared to rock bed storage. A single fan 45 and motor 46 drive the air through the bin and through the appropriate plenum. At the outlet end of bin 12 is plenum 50 that leads to branch 51 returning air to the solar collector and branch 52 carrying air to the dwelling house heating system. Valve 53 again selectively opens either or both branches to plenum 50.

Maximum solar collector efficiency is obtained when the fluid received by the collector from the storage bin 12 is at the coolest possible temperature. The heat reservoirs 10 should therefore act as independent heat exchangers to provide good temperature stratification in the bin 12, with the highest temperatures being near the fluid inlet and the lowest temperatures being near the fluid outlet. When the reservoirs are spheres having plastic shells, temperature stratification is at a maximum because the plastic does not tend to conduct heat between shells as readily as will aluminum or similar metals. Furthermore, heat conductivity enhancers in the shells will enhance the heat transfer from heated fluid to the contained phase change medium in the shells. The spheres will contact neighboring spheres only at a single point, both reducing direct conduction of heat between spheres and exposing a maximum of the shell surface area to the solar heated fluid. If metal cylinders are used in place of plastic spheres, insulation means must be used between the cylinders to optimize temperature stratification in the bin. The insulation means may be any physical object placed between adjacent cans, including a localized coating, tape, or plastic ring or band around each can.

The thermal storage system has been described with respect to a solar heating unit; however, it should be understood that the system is suited for use with many other types of heating or cooling devices. For example, the system may be used for night radiation cooling or with a heat pump. With electrical resistance heating, the system could be warmed during off-peak electrical demand hours, and the heat utilized during peak demand hours.

I claim:

1. An improved thermal storage reservoir for use in a thermal storage system of the type having a storage bin containing a plurality of discrete thermal storage reservoirs in stacked, abutting relationship in the storage bin, for use with a circulating fluid that is passed through the stack of reservoirs for exchange of energy between the fluid and the reservoirs, wherein the improved reservoir comprises:
    (a) a shell having a regular sphere-like geometric shape for creating an array of reservoirs in the storage bin with predictable flow characteristics therethrough;
    (b) said shell being constructed of heat conductive material defining an interior cavity within the reservoir and defining a substantially diametric passageway through the sphere-like shape for conducting heat between the solar-heated fluid and the heat storage media; and
    (c) heat storage media contained within said cavity, the shell conducting heat between the solar heated fluid and the heat storage media.

2. The thermal storage media reservoir of claim 1, wherein said heat conductive shell material comprises plastic having non-plastic heat conductivity enhancers therein throughout the thickness of the shell.

3. The thermal storage system of claim 2, wherein said heat conductivity enhancers are selected from the group consisting of glass fibers, glass particles, and metallic particles.

4. The thermal storage system of claim 3, wherein said shell material contains between 30% and 50% by volume heat conductivity enhancers.

5. The thermal storage system of claim 2, wherein said shell further comprises a rough textured outer surface.

* * * * *